Dec. 12, 1933.   H. K. WHEELER   1,939,637
MEANS OF STORING MOTOR VEHICLES
Filed Oct. 31, 1930   2 Sheets-Sheet 1
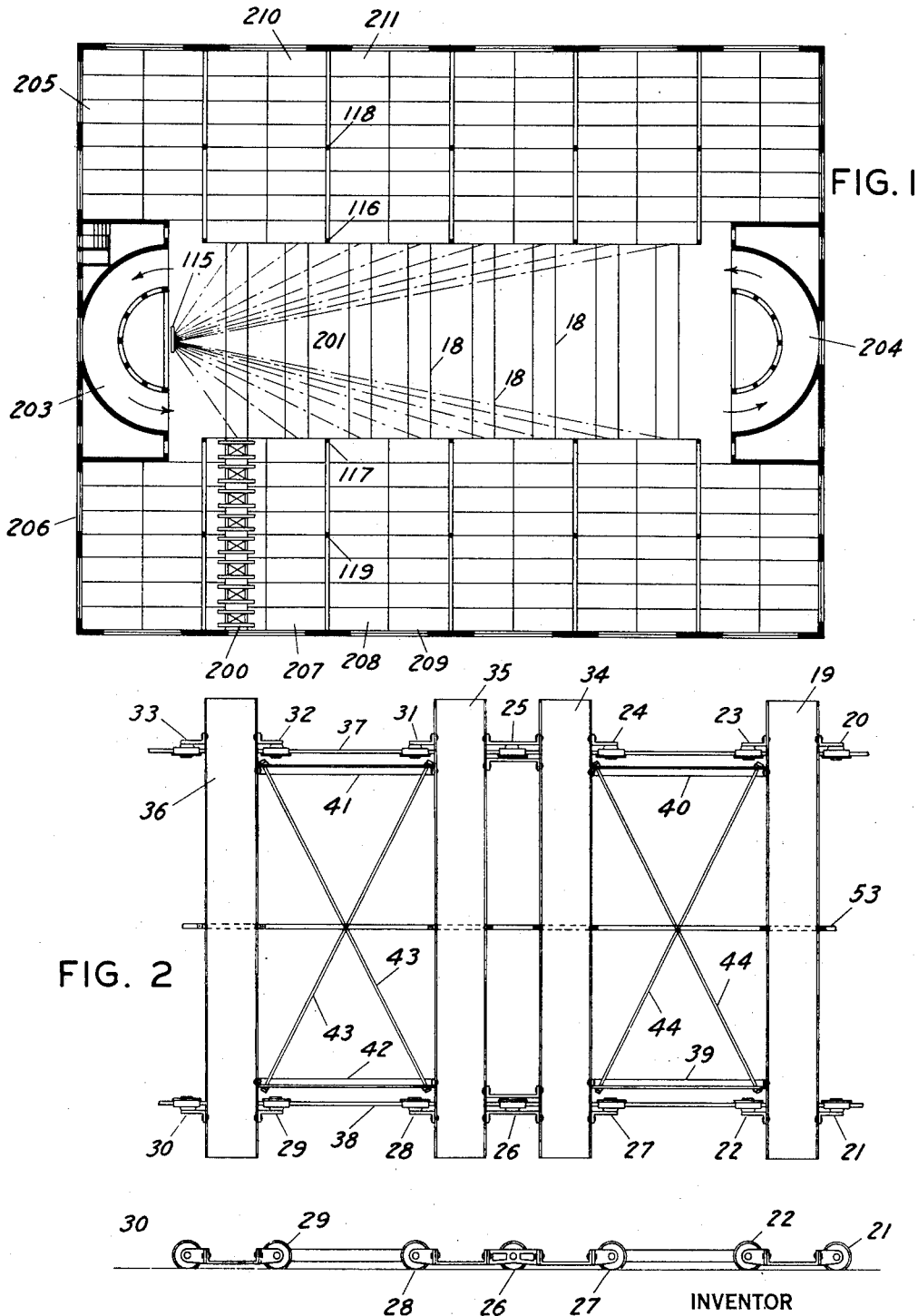
INVENTOR
HOLMAN K. WHEELER
BY
ATTORNEY Dec. 12, 1933.    H. K. WHEELER    1,939,637
MEANS OF STORING MOTOR VEHICLES
Filed Oct. 31, 1930    2 Sheets-Sheet 2

INVENTOR
HOLMAN K. WHEELER
BY
ATTORNEY

Patented Dec. 12, 1933

1,939,637

UNITED STATES PATENT OFFICE 1,939,637

MEANS OF STORING MOTOR VEHICLES

Holman K. Wheeler, Newton Center, Mass., assignor to Mechanical Transfer Car Corporation, St. Johnsbury, Vt., a corporation of Vermont Application October 31, 1930. Serial No. 492,525

3 Claims. (Cl. 214—16.1)

The present invention relates to a system for the storage of wheeled vehicles, and in particular to a system in which auxiliary or transfer cars are used on which the wheeled vehicles may be placed.

The ordinary system of storing of vehicles such as automobiles is in general accomplished without the use of auxiliary means for the storage of the same. There are, however, systems employing auxiliary devices for the storage of motor vehicles or the like which have proved to be very successful in efficiently and economically storing motor vehicles in garages, or other storage places. One of the systems is shown in the Fessenden Patent No. 1,114,975 of October 27, 1914, and in my co-patenting applications Serial No. 322,024 of November 26th, 1928, and No. 351,853 of April 2, 1929.

The present invention is an improvement over the system and method shown in the prior art, and makes it possible to store motor vehicles even more efficiently and at lower cost than the systems previously used. The invention will be more readily understood from a consideration of the description given below in connection with the drawings, in which, Figure 1 shows a floor layout of one floor of a storage house or garage.

Figure 2 shows a plan view of a detail of the invention.

Figure 3 shows an elevation of Figure 2.

Figure 4:
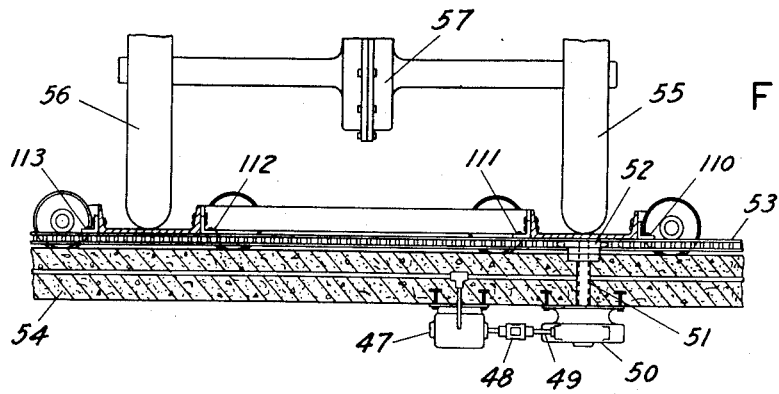
Figure 4 shows a further detail of the system.

In the system shown in Figure 1, the multiple transfer car 200 may be moved into and out of the center space 201 on the track 18 which extends all the way across the floor. The center space 201 is preferably made substantially the same width as the side spaces 205 and 206 in which groups of transfer cars of the same type as the car 200 are parked.

In the design as indicated in Figure 1, a transfer car 200 may occupy each row, and likewise move on tracks 18 extending across the floor from the space on one side to the corresponding space on the other side, such as 207, 208, 209, 210, 211, etc. A motor vehicle may be stored on one element of the transfer car in the storage aisle and the transfer cars may be moved out into the center aisle, either all the way or part of the way in allowing the motor vehicle to mount the transfer car or to leave it.

The garage floor is preferably laid out so that the columns as indicated by 116, 117, 118 and 119 come between the rows of transfer cars. At the ends of the open center space 201 are situated half ramps 203 and 204 which are conveniently used in connection with the center open space in a number of advantageous ways depending upon the way the cars happen to be placed in the open space and the amount of traffic to be handled.

As shown in Figure 1, the ramp 203 may come up from the floor below and the ramp 204 go to the floor above. Traffic may be directed across the floor so as to avoid turning the car on the floor; that is, a car coming up the ramp 203 may be sent across the floor and go to the floor above up the ramp 204. On the other hand the open space 201 is wide enough so that a car can turn around on it and go up to the next floor on the same side.

This is impossible to do in garages having ramps as heretofore used. Another advantage of the system shown in Figure 1 is that the cars, as they reach the floor, are facing in the right direction to run on the transfer cars, and when the cars are removed they are also facing the right direction to be driven immediately down the ramp, in both cases eliminating any turning or backing of the car.

Figure 7:
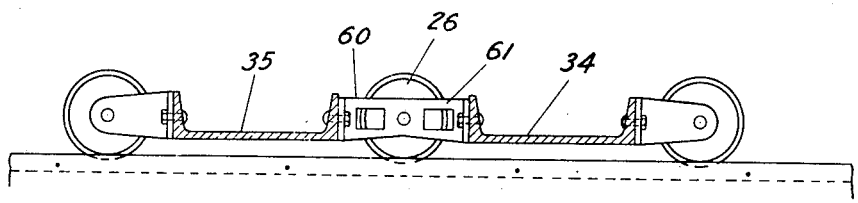
Figure 7 shows a further detail of the transfer car.

The storage element 201, is driven by a single driving mechanism shown in Figures 2 and 4. In Figure 2, it will be noted that a multiple element comprises a series of channels 19, 34, 35 and 36 which are joined by cross beams 39, 40, 41 and 42, and by the cross rods 43 and 44. The channels 35 and 34 are joined by means of the wheel and truck 25 and 26 which is shown in greater detail in Figure 7. The wheel 26 has a double bracket 60, on one side and 61 on the other side which are bolted to the channels 35 and 34 respectively, in such a manner that they may readily be removed. It will thus be noted that the multiple element 201 may be made up in any number of elements, merely by using the joining trucks 25 and 26 to join adjacent elements. In this way it is possible to send out in shipment the elements individually and to set them up in groups on the floor in installing. It is also possible by this method to remove easily an element if desired or to substitute a new element or to change the number of elements going to make up the unit. The flexibility of the system allowed by this feature is very useful and makes it possible to adapt the storage space from time to time in a different manner. It is also possible in the present system to preserve the advantage of a low transfer element, as by means of the joining trucks 25 and 26. Each channel bears only the weight of the wheels upon it, and there is no bending tension due to the weight being assumed by the cross supports.

Figure 5:
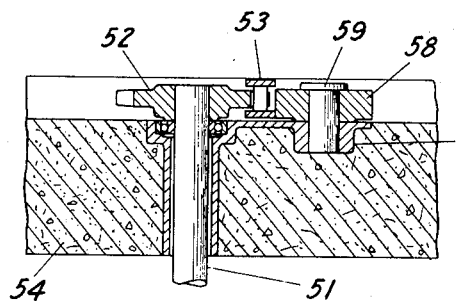
Figure 5 shows a detail shown in Figure 4.
Figure 6:
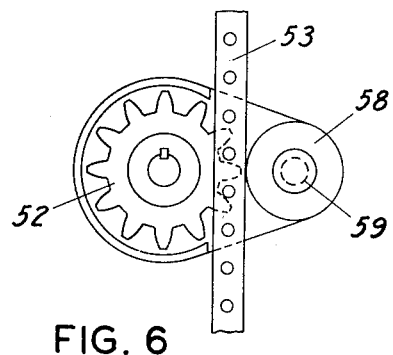
Figure 6 shows a plan view of the detail shown in Figure 5.
Figure 8:
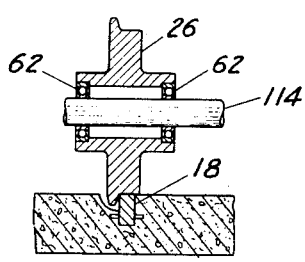
Figure 8 shows a section on the line 8—8 of Figure 7.
Figure 9:
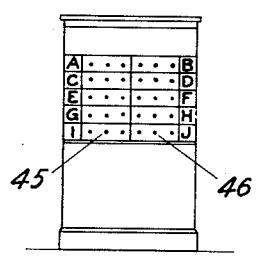
Figure 9 shows a further detail.

The multiple elements are moved into the center aisle and back again by means of a system driving the rack 53 as will better appear from Figure 4. The motor 47 for driving the system may be located on the ceiling of the floor beneath, or in a pit beneath the floor. The motor shaft is linked by the shaft 48 to a reduction gear system 50, through the shaft 49. The reduction gear drives the shaft 51, on the upper end of which is a sprocket 52 rotatable in a plane parallel with the floor and just above it. As shown in Figures 5 and 6, adjacent to the sprocket wheel, is a thrust wheel 58 set in the thrust bearing 60 in the floor by means of the shaft 59. The rack 53 is moved by the sprocket wheel 52 longitudinally along the floor and is driven between the sprocket and the thrust wheel, the latter aiding in keeping the rack meshing with the sprocket. As shown in Figure 4, the rack is stretched transversely across the bottom of the transfer car, and is bolted thereto by means of the sprockets, 110, 111, 112, and 113 attached to the channel members. The multiple elements move on the wheels, a cross section of which is shown in Figure 8, where 26 indicates the wheel, and 114 the bearing, the wheel setting on the bearing in the ball bearings 62. The wheel 26, it will be noted, is of the flange type, having a flange on the inner side and resting on a track 18, one side of which is flush with the floor and the other side of which is cupped out as shown, to receive the flange of the wheel. In this manner, it is possible for the car to easily retain its position when the automobile is being driven on it from either direction, while at the same time, the track does not project above the floor level. Since the flange being on the inner side of the wheels, it will also be noted that the cup shape groove between the floor and the track is also on the inner side. The operation of the system on the floor may be controlled from an operator's switchboard shown in Figure 9 and positioned at the point 115 as shown in Figure 1 sufficiently above the floor level, so that the operator has a clear view from his position of each aisle, as indicated by the broken lines in Figure 1. In the present system the floors may be numbered, and when each car enters a duplicate ticket may be given indicating the floor and row and number of the row. The car is parked according to the indication on the duplicate ticket, and when it is desired to remove the car, the customer will take the ticket to the floor attendant who will operate as indicated on the card, the correct row and allow this row to come out. The customer or attendant can then remove the car from the transfer car and drive it on one of the elevators. As indicated in Figure 9, the moving in and out of the transfer cars may be controlled by a system of push buttons controlling the motors 57 beneath the floor through proper electrical conductors.

Having now described my invention, I claim:

1. A system for the storage of vehicles comprising a building having a plurality of floors including a plurality of multiple transfer car units arranged to move laterally across said floors, a center open space running longitudinally on said floor with the rows of said units normally placed at the side of said space, said units being substantially as long as said space is wide, and half ramps at opposite ends of said space opening up into said space.

2. A system for the storage of vehicles, comprising a building having a plurality of floors, each floor having three longitudinal sections, the outer of which are adapted to receive the vehicles, a plurality of multiple transfer cars arranged in rows in said outer sections and adapted to move transversely into the center section and half ramps situated at the end of the center section, said half ramps being substantially the same width as said section.

3. A system for the storage of vehicles comprising a building having a plurality of floors each floor having a center open aisle and side spaces of the same width, a plurality of multiple transfer cars arranged in the side spaces, means for moving said cars from the side space laterally to the center aisle, and a half ramp of the same width as the central space situated at either end of the aisle.

HOLMAN K. WHEELER.